United States Patent
Merino Lopez

(10) Patent No.: US 10,414,208 B2
(45) Date of Patent: Sep. 17, 2019

(54) ROLLING ASSEMBLY

(71) Applicant: COMPAGNIE GENERALE DES ETABLISSEMENTS MICHELIN, Clermont-Ferrand (FR)

(72) Inventor: José Merino Lopez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 145 days.

(21) Appl. No.: 15/549,241

(22) PCT Filed: Jan. 14, 2016

(86) PCT No.: PCT/EP2016/050688
§ 371 (c)(1),
(2) Date: Aug. 7, 2017

(87) PCT Pub. No.: WO2016/124366
PCT Pub. Date: Aug. 11, 2016

(65) Prior Publication Data
US 2018/0037061 A1    Feb. 8, 2018

(30) Foreign Application Priority Data

Feb. 5, 2015  (FR) .................................... 15 50886

(51) Int. Cl.
*B60C 5/16*        (2006.01)
*B60C 15/02*       (2006.01)
(Continued)

(52) U.S. Cl.
CPC ................ *B60C 5/16* (2013.01); *B60B 21/12* (2013.01); *B60B 25/14* (2013.01); *B60C 15/022* (2013.01);
(Continued)

(58) Field of Classification Search
CPC ..... B60C 5/16; B60C 15/022; B60C 15/0209; B60C 19/088; B60C 15/036; B60B 25/14; B60B 21/12
(Continued)

(56) References Cited

U.S. PATENT DOCUMENTS 4,373,567 A * 2/1983 Declercq ................. B60B 21/10
                                                152/379.3
4,408,379 A * 10/1983 Kusano .................. B21D 53/30
                                                29/894.353

(Continued)

FOREIGN PATENT DOCUMENTS

CN    101 941 363      1/2011
EP       3197690       8/2017
(Continued)

*Primary Examiner* — S. Joseph Morano
*Assistant Examiner* — Jean W Charleston
(74) *Attorney, Agent, or Firm* — Cozen O'Connor

(57) ABSTRACT

Rolling assembly comprising tire P, rim J, adapter connecting a bead and the rim. The adapter has axially outer (9) and inner (10) ends mounted on rim seat (7) having respective outer (16) and inner (20) reinforcers. Body (11) connects the outer (9) and inner (10) ends forming a single piece, an adapter seat (18) receives a bead and is situated at end (9), an adapter bearing face (21) in a plane perpendicular to the rotation axis, and situated on the axially inner face of outer end (9). Reinforcer (20) of end (9) is axially outside bearing face (21). The body comprises, opposite adapter seat (14), annular seat reinforcer (19) and the adapter comprises conductive strip (22) positioned over all or part of the circumferential perimeter of said adapter and along a complete path extending from adapter seat (14) to rim flange (8).

21 Claims, 3 Drawing Sheets

(51) Int. Cl.
*B60B 21/12* (2006.01)
*B60C 19/08* (2006.01)
*B60B 25/14* (2006.01)
*B60C 15/036* (2006.01)

(52) U.S. Cl.
CPC ........ B60C 15/0209 (2013.01); B60C 19/088 (2013.01); *B60C 15/036* (2013.01)

(58) Field of Classification Search
USPC ...................................................... 152/379.4
See application file for complete search history.

(56) References Cited

U.S. PATENT DOCUMENTS

| | | | | |
|---|---|---|---|---|
| 5,232,033 A | * | 8/1993 | Durif | ..................... B60B 21/10 |
| | | | | 152/379.3 |
| 5,232,034 A | * | 8/1993 | Gergele | .................... B60C 5/16 |
| | | | | 152/379.4 |
| 5,526,217 A | * | 6/1996 | Gormley | .............. H01R 13/641 |
| | | | | 361/119 |
| 6,626,217 B2 | * | 9/2003 | Bestgen | .................. B60B 25/18 |
| | | | | 152/379.4 |
| 2006/0021687 A1 | * | 2/2006 | Dheur | ................... B60C 1/0016 |
| | | | | 152/152.1 |
| 2016/0311255 A1 | * | 10/2016 | Ahouanto | ........... B60C 15/0213 |
| 2017/0057299 A1 | * | 3/2017 | Daval | ..................... B60C 15/02 |
| 2017/0291457 A1 | | 10/2017 | Topin et al. | |

FOREIGN PATENT DOCUMENTS

| | | |
|---|---|---|
| FR | 2 491 836 | 4/1982 |
| WO | WO 00/78565 | 12/2000 |
| WO | WO 2016046197 | 3/2016 |

\* cited by examiner

ROLLING ASSEMBLY

RELATED APPLICATIONS

This is a U.S. National Phase Application under 35 USC 371 of International Application PCT/EP2016/050688 filed on Jan. 14, 2016.

This application claims the priority of French application no. 1550886 filed Feb. 5, 2015, the entire content of which is hereby incorporated by reference.

FIELD OF THE INVENTION

The invention relates to a rolling assembly formed mainly of a tyre and a rim and that is intended for passenger vehicles and vans.

Definitions

A reminder of the definitions used in the present invention is given below:
"axial direction" is a direction parallel to the rotation axis of the tyre,
"radial direction" is a direction that intersects the rotation axis of the tyre and is perpendicular thereto,
"circumferential direction" is a direction perpendicular to a radius and contained in a plane perpendicular to the rotation axis of the tyre,
"radial section" is a section in a plane which contains the rotation axis of the tyre,
"equatorial plane" is the plane perpendicular to the rotation axis and passing through the middle of the tread.

BACKGROUND OF THE INVENTION

It is already known from the application WO00/78565 to insert an elastic adapter between the rim and the beads of a tyre. This adapter is elastically deformable in the radial and axial directions. Such an adapter makes it possible to separate that part of the rolling assembly that can be considered to actually act as a tyre from that part of the rolling assembly that can be considered to act as a rim.

However, although such an assembly also makes it possible to ensure the functions of a conventional tyre, notably a drift thrust response of the tyre following the application of a drift angle to the tyre, thereby giving the assembly sufficient flexibility to avoid any surface deterioration or depth deterioration thereto, it does not however perfectly reduce the wear of the tyre and of the adapter during rare cases of flattening of said tyre, for example following an impact with a kerb or in a pothole or else following puncturing by objects of small or large diameters (greater than or equal to 7 mm).

Indeed, in these rare cases, the tyre running flat will be in contact with the adapter in an unequal manner due to the different speeds between the speed of the tyre and that of the adapter. This difference in speed results in a slipping phenomenon between the tyre and the adapter. This slipping will cause the premature wear of the tyre and of the adapter.

No suggestion is given in this document regarding structural adaptations that would lead to this wear being reduced.

Also, there remains the need for a new device comprising an adapter that ensures a better protection of the tyre when running flat, following a violent impact or a puncture, while at the same time avoiding the build-up of static electricity which is likely to generate sparks.

SUMMARY OF THE INVENTION

One aspect of the present invention is directed to a rolling mounted assembly having a rotation axis and comprising:
 a tire having two beads and an inner wall,
 at least one adapter,
 a rim,
 said adapter providing the connection between one of the beads and the rim, and having a circumferential perimeter,
said rim having two rim seats and two rim flanges,
said adapter having:
 an axially inner end that is intended to be mounted on the rim seat and comprises an inner reinforcing element,
 an axially outer end that comprises an outer reinforcing element,
 a body that connects said outer end to said inner end so as to form a single piece and comprises at least one main reinforcement that provides the connection between said outer reinforcer and said inner reinforcer,
 a substantially cylindrical adapter seat intended to receive one of said beads, said seat being situated at the axially outer end of said body,
 an adapter bearing face substantially contained in a plane perpendicular to the rotation axis, said bearing face being situated on the axially inner face of the axially outer end.

The adapter is characterized in that the reinforcing element of the axially outer end is entirely situated axially outside the bearing face, in that the body comprises, opposite the adapter seat, an annular seat reinforcer and in that the adapter comprises at least one, optionally removable, conductive strip positioned over all or part of the circumferential perimeter of said adapter and along a complete path extending from the adapter seat to the rim J.

The axially outer end of the adapter delimits, axially, a "housing intended to receive the bead of the tyre". The bearing face of the axially outer end serves to support the bead of the tyre in the axial direction, in the same way as a rim flange.

Thus, the housing receives the bead of the tyre just as the seat of a rim conventionally does. The tyre is then immobilized axially by the inflation pressure, and is pressed against the bearing face of this axially outer end in the same way as is conventionally done for the bead of a tyre against the rim flange of a rim.

The axially inner end of the adapter may be denoted "adapter bead" since it is intended to couple the adapter to the rim flange of a rim in the same way as is conventionally done by the bead of a tyre.

Thus, when the rolling assembly according to an embodiment of the invention is in operation and at the operating stresses for which it is designed, the tire is immobilized axially with respect to the rim, more specifically the beads of the tire are immobilized axially with respect to the rim in the same way as for a conventional rolling assembly in which the beads of the tire are mounted directly on the seats of a rim, while the beads of the tire are not immobilized radially with respect to the rim, more specifically the beads of the tire are capable of a degree of radial movement with respect to the rim. Under standard rolling conditions, it may be said that there is virtually no axial deformation of the adapter, or that it is negligible with respect to the radial deformation.

On the other hand, during an impact, the axial deformation of the adapter can be great, thereby contributing to reducing the stresses on the mounted assembly.

The mounted assembly according to the invention has the advantage of having a simple design and being easy to mount. The mounted assembly according to the invention furthermore makes it possible to protect the tyre against the negative effects of static electricity.

The presence of the conductive strip additionally makes it possible to ensure the conduction of electricity between the ground and the wheel, and therefore between the ground and the vehicle, in particular when the conductivity of the elastomer compositions is insufficient, especially as the tyre does not rest directly on the wheel but on an adapter.

Finally, the adapter according to the invention has the advantage of significantly reducing the level of mechanical forces towards the chassis in the event of an impact, and thus of making it possible to make the body shell of the vehicle lighter.

Another aspect of the invention is directed to an adapter as defined above.

Preferably, the conductive strip is positioned entirely at the radially outer surface of the body or is partially buried under the radially outer surface of the body.

Preferably, the conductive strip has an electrical resistivity less than or equal to $10^8$ ohm·cm, and preferably less than or equal to $10^7$ ohm·cm.

Preferably, the conductive strip is made up, as desired, of a metallic leaf or of an elastomer composition comprising carbon black in an amount greater than or equal to 15% and preferably greater than or equal to 20%, it being possible for the carbon black in the elastomer composition to have a specific surface area greater than or equal to 500 $m^2$/g.

Preferably, the conductive strip is adhesively bonded or crosslinked to the elastomer composition of the body.

Preferably, the reinforcing element of the axially outer end is positioned radially on the outside of the adapter seat.

Preferably, the annular seat reinforcer has a compression modulus greater than or equal to 1 GPa, and preferably greater than 4 GPa, and more preferably greater than 10 GPa. The annular reinforcer may be made up of a core surrounded by an elastomer, or of a succession of layers of elastomer compounds and metal and/or textile reinforcers positioned in any possible combination. The core may comprise at least one element chosen from a metal, a composite material, a thermoplastic, and a mixture thereof. The composite material may be made from glass fibres embedded in a resin matrix.

The list of elastomers that can be used includes, firstly, rubbers that are crosslinkable by chemical vulcanization reactions by sulphur bridges, by carbon-carbon bonds created by the action of peroxides or of ionizing radiation, by other specific atom chains of the elastomer molecule, secondly, thermoplastic elastomers (TPEs) in which the elastically deformable part forms a network between rather non-deformable "hard" regions, the cohesion of which is the product of physical connections (crystallites or amorphous regions above their glass transition temperature), and next non-thermoplastic elastomers and finally thermosetting resins.

The annular seat reinforcer may be made up of at least two layers of different constituents positioned successively and in alternation. Positioned in alternation means successive disposition of a first layer and then a second layer, several times.

The annular seat reinforcer may have an overall axial length greater than or equal to 30% of the width of the bead of the tyre, and less than 150% of this same width, and more preferably between 40 and 110% of the width of the bead of the tyre.

The annular seat reinforcer may have a mean radial thickness greater than or equal to 0.3 mm and less than or equal to 20 mm depending on the size and the use of the tyre. Thus, for a passenger vehicle tyre, the thickness is preferably between 0.5 and 10 mm.

The annular seat reinforcer preferably comprises at least one element chosen from a metal, a composite material, a thermoplastic, and a mixture thereof. This core or this multilayer is preferably contained between two layers of a matrix comprising the choice of an elastomer as cited above, a resin or a mixture thereof.

The annular seat reinforcer preferably consists of a stack of different layers of elastomer compounds with identical or different chemical natures.

When it is in the form of a stack of layers, the reinforcer preferably has an axial length greater than 5 mm and less than 25 mm and a radial thickness greater than or equal to 0.1 mm and less than or equal to 4 mm.

Each single element of which the stack of the reinforcer is made may have an axial width greater than 1 mm and less than 25 mm and an identical or different radial thickness greater than or equal to 0.1 mm and less than or equal to 2 mm.

The annular seat reinforcer may also be in the form of a stack of single threads between a layer of a matrix comprising the choice of an elastomer, a thermoplastic compound, a resin, or mixtures thereof. The single threads may be threads that are conventionally used, such as textile threads (polyester, nylon, PET, aramid, rayon, natural fibres (cotton, flax, hemp)), metal threads, composite threads (carbon, glass-reinforced resin), or mixtures of these constituents.

The annular seat reinforcer may also be in the form of one or more plies, the reinforcers of which are positioned at an angle of between 0 and 90° with respect to the circumferential direction of the tyre.

Preferably, the annular reinforcer may be positioned radially on the outside or radially on the inside of the body of the adapter, on either side of said body, or else between the plies of reinforcing elements of the body of the adapter.

The outer reinforcing element may consist of metal (steel), nylon, PET or aramid. It may comprise a matrix of resin and/or reinforcing fibres, such as rayon, aramid, PET, nylon, glass fibre, carbon fibre, basalt fibre, poly(ethylene 2,6-naphthalate) (PEN), polyvinyl alcohol (PVA).

The main reinforcement of said body may have a modulus greater than or equal to 4 GPa; it may consist of metal (steel), of textile cord (rayon, aramid, PET, nylon, glass fibre, carbon fibre, basalt fibre, poly(ethylene 2,6-naphthalate) (PEN), or polyvinyl alcohol (PVA)).

Preferably, the adapter may be positioned on just one side of the rim, and preferably on the outer side of the vehicle. In this case, the rim has an asymmetrical geometric shape so as to adapt to the presence of the adapter present on just one side.

The adapter may also be present on each side of the rim.

When the mounted assembly comprises two adapters, the latter may be symmetrical or non-symmetrical. The concept of symmetry or asymmetry of the adapter is defined by the axial length of the body of the adapter. Two adapters are asymmetrical when the body of one of them has an axial length greater than that of the other.

Preferably, the rim is made from a material selected from steel, alloys of aluminium and/or of magnesium, composite materials based on carbon fibres, glass fibres, aramid fibres, plant fibres, said fibres being comprised in a matrix based on thermosetting compounds or on thermoplastic compounds, or from a complex compound comprising an elastomer and a complex based on resin and fibres selected from carbon fibres, glass fibres, aramid fibres, plant fibres or from any combination of materials.

Since the composite materials are not conductive, the mounted assembly then comprises a conductive element positioned between the adapter and the hub or the fastening bolt.

Preferably, the fibre-based composite materials contain fibres of a length greater than or equal to 5 mm.

The matrix based on thermosetting compounds may be selected from epoxy resins, vinyl ester, unsaturated polyesters, cyanate ester, bismaleimide, acrylic resins, phenolic resins, polyurethanes and combinations thereof.

Preferably, the matrix based on thermoplastic compounds is selected from polypropylene (PP), polyethylene (PE), polyamides (PAs), semiaromatic polyamides, polyester (PET), polybutylene terephthalate (PBT), polyetheretherketone (PEEK), polyetherketoneketone (PEKK), polyethersulphone (PSU), polyetherimide (PEI), polyimide (PI), polyamideimide (PAI), polyphenylene sulphide (PPS), polyoxymethylene (POM), polyphenylene oxide (PPO).

BRIEF DESCRIPTION OF THE DRAWINGS

The invention will now be described with the aid of the examples and the figures which follow and which are given purely by way of illustration and in which.

DETAILED DESCRIPTION OF THE DRAWINGS

Figure 2:
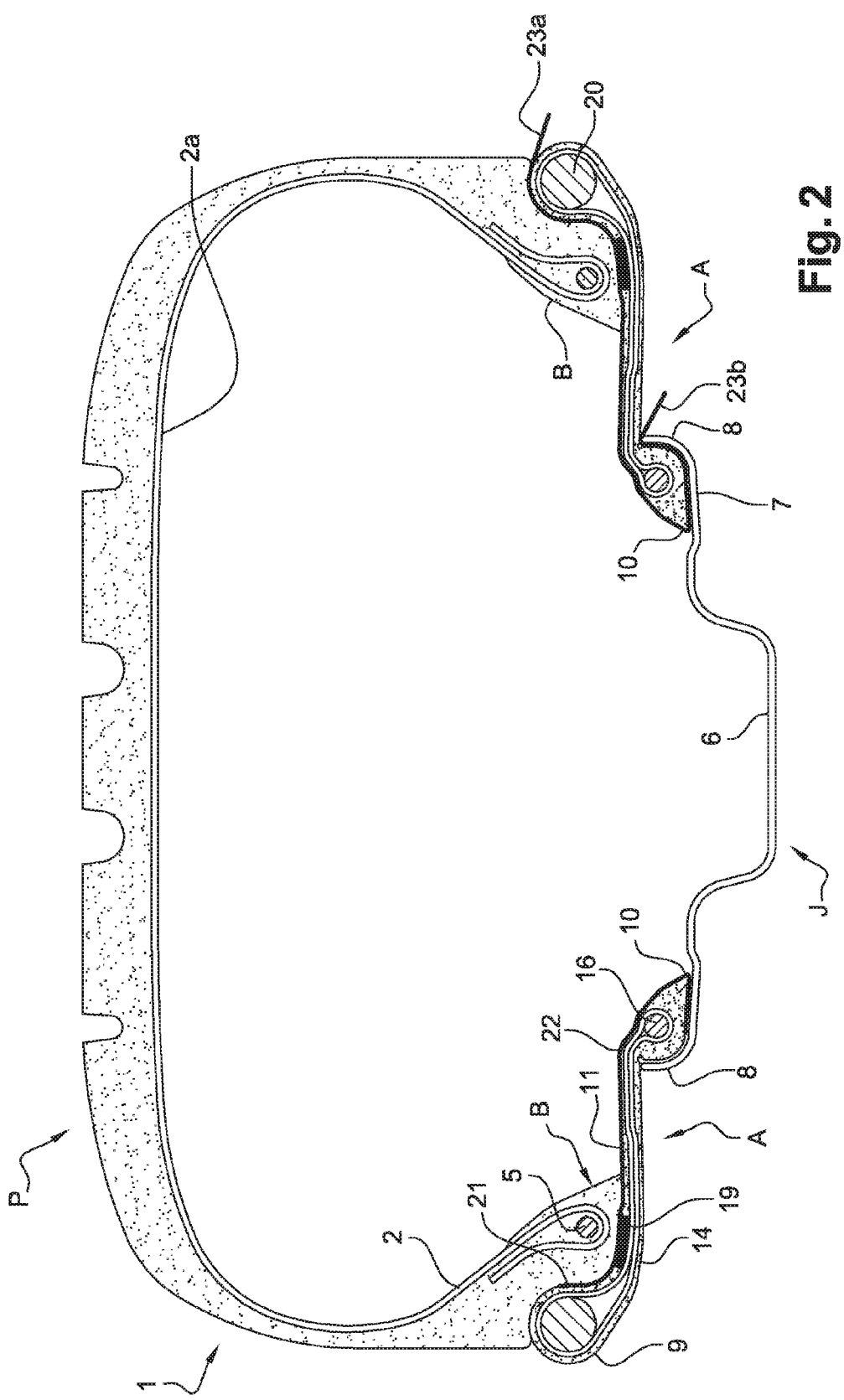
FIG. 2 shows a schematic view, in radial section, of a mounted assembly according to an embodiment of the invention, comprising a fixed adapter on the left-hand side of the figure, and a removable adapter on the right-hand side of the figure.

As FIG. 2 shows, the mounted assembly of general reference 1 comprises a tyre P, mounted on two adapters A, themselves mounted on a rim J.

The mounted assembly according to the invention can be used with any type of tyre, be they radial- or cross-ply tyres, or even with tyres of the type having self-supporting sidewalls.

The mounting of this assembly according to the invention takes place in a conventional manner. The adapters are firstly positioned on the rim, then the tyre is positioned on the adapters.

The tyre of which the design per se is unaltered in the invention, consists of a tread reinforced by a crown reinforcement joined to two beads B on either side of an equatorial plane XX' passing through the centre of the tyre, by way of two sidewalls 1. A carcass reinforcement 2 that mainly reinforces the sidewalls 1 is anchored in each bead B to at least one bead wire, in this case of the "braided" type 3, so as to form turn-ups 4.

The radially inner wall 2a of the carcass ply 2 is covered with a layer of elastomer composition (not represented), the role of which is to render the tyre airtight to the gas.

The rim J comprises a groove 6, known as a mounting groove, that connects, on either side of the equatorial plane, two rim seats 7 that are axially extended by rim flanges 8, the radially outer edges of which are curved.

The adapter A mainly comprises an axially outer end 9, an axially inner end 10 and a body 11 connecting the said end 9 to the said end 10.

The axially outer end 9 comprises an outer reinforcing element 20. The adapter A, which is positioned at each bead B of the tyre, may be symmetrical or non-symmetrical. Symmetry means that the overall length of the body 11 is identical on the two adapters. When the assembly (tyre, rim and adapter) is mounted, the bead B of the tyre is positioned on an adapter seat 14 and made to bear axially against a bearing face 21.

The adapter comprises, on one side, an axially outer end 9 with an outer reinforcer 20 having a substantially spherical geometric shape in section, consisting of a composite material such as glass-reinforced resin, and, on the other side, an axially inner end 10 with a metal reinforcer 16, and finally a body 11 made up of two plies (not represented) that comprise textile cords. The cords of each ply are mutually parallel. On the one hand, said plies are attached axially on the inside and radially on the outside to the walls of the reinforcer 20, and on the other hand, they are anchored, in the end 10, to the metal reinforcer 16, such as a bead wire forming a turn-up at each end.

The body 11 comprises a substantially cylindrical adapter seat 14 that is intended to receive a bead of the tyre that is disposed at the axially outer end of the body 11.

The body 11 also comprises an adapter bearing face 21 that is contained substantially in a plane perpendicular to the rotation axis, is situated on the axially inner face of the axially outer end, and is intended to keep the bead in place in its housing.

Each adapter represented in FIG. 2 comprises a conductive strip 22. The adapter on the left-hand side of the figure represents a fixed conductive strip 22 and the right-hand side of said figure represents a removable conductive strip 22.

Figure 1:
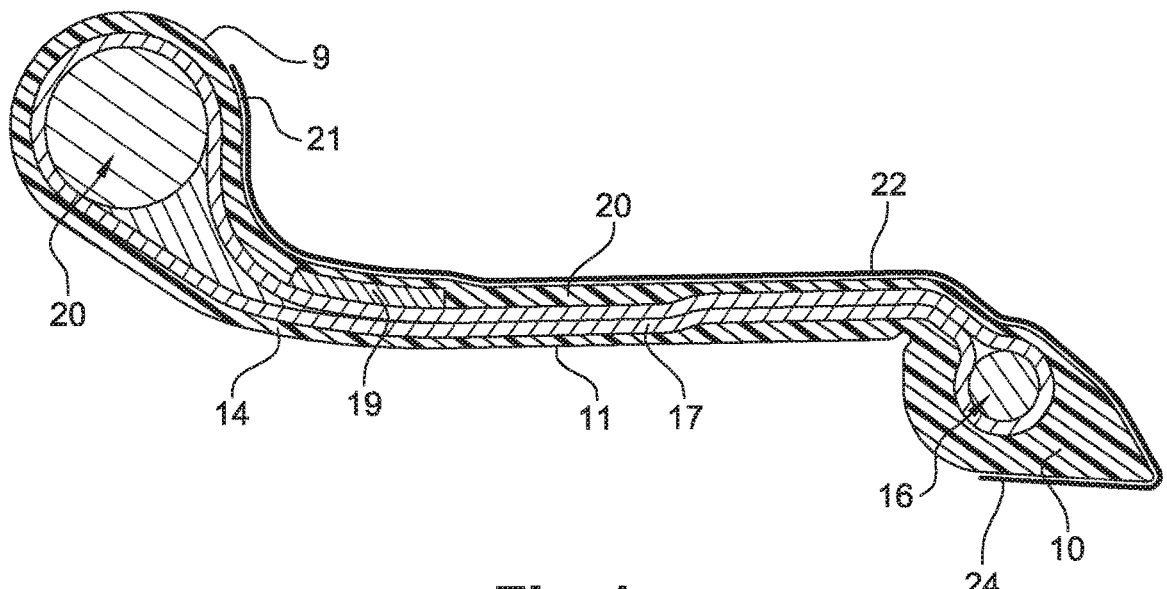
FIG. 1 shows a schematic view, in radial section, of the fixed adapter, according to a first variant, and constituting the mounted assembly according to an embodiment of the invention.

As shown in FIG. 1, the adapter comprises an annular seat reinforcer 19, which is not attached to the outer reinforcer 20. These two reinforcers 19, 20 are entirely independent of one another.

The reinforcer 19 is made up of a tri-layer comprising metal reinforcers in the form of wires, alternating with an elastomer of the rubber-resin type. The reinforcer 19 has a radial thickness of about 1.5 mm and an axial length of about 15 mm.

The elastomer layer of the reinforcer 19 has a radial thickness of about 0.3 mm and an axial length of about 15 mm. A layer of elastomer covers all of the elements that make up the adapter, namely the reinforcer 20, the reinforcer 16, the body 11 and the radially outer surface of the reinforcer 20.

The conductive strip 22 represented in FIG. 1 is positioned along a path ranging from the adapter seat 14 to the rim flange 8. According to this representation, the conductive strip 22 is fixed, and is fastened to the surface of a path that extends from the adapter seat 21 to the radially inner portion of the axially inner end 10.

The assembly according to FIG. 2 comprises, on the left-hand side a conductive strip 22 positioned on a path that extends from the adapter seat 14 to the rim flange 8. This conductive strip 22 is partially buried under the radially outer surface of the plies constituting the body 11. This strip 22 is made of a metallic leaf that has a mean thickness between 0.005 and 1 mm.

The right-hand side of FIG. 2 represents a removable conductive strip 22. This strip 22 is not present on the adapter but is positioned on the mounted assembly during mounting. This strip 22 is also positioned along a path that extends from the adapter seat 14 to the rim flange 8. Portions 23a, 23b of gripping means connected to the metal strip jut out from the mounted assembly so as to facilitate the dismantling steps.

Figure 4:
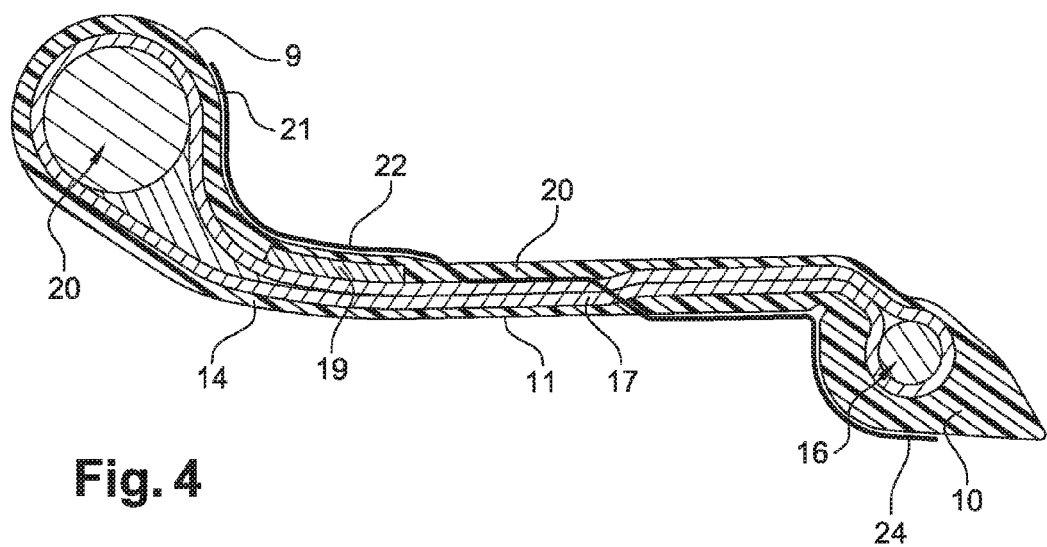
FIG. 4 shows a schematic view, in radial section, of the fixed adapter, according to a second variant, and constituting the mounted assembly according to an embodiment of the invention.

FIG. 4 represents a variant of the installation of the conductive strip on the adapter. In this figure, it is seen that the conductive strip 22 is positioned in a fixed manner along a path ranging from the surface of the adapter seat 14 to the radially inner portion 24a of the axially inner end 10 while passing through the inside of the body 11 of the adapter. The passage through the body takes place so as to respect the plies forming the adapter.

Figure 3:
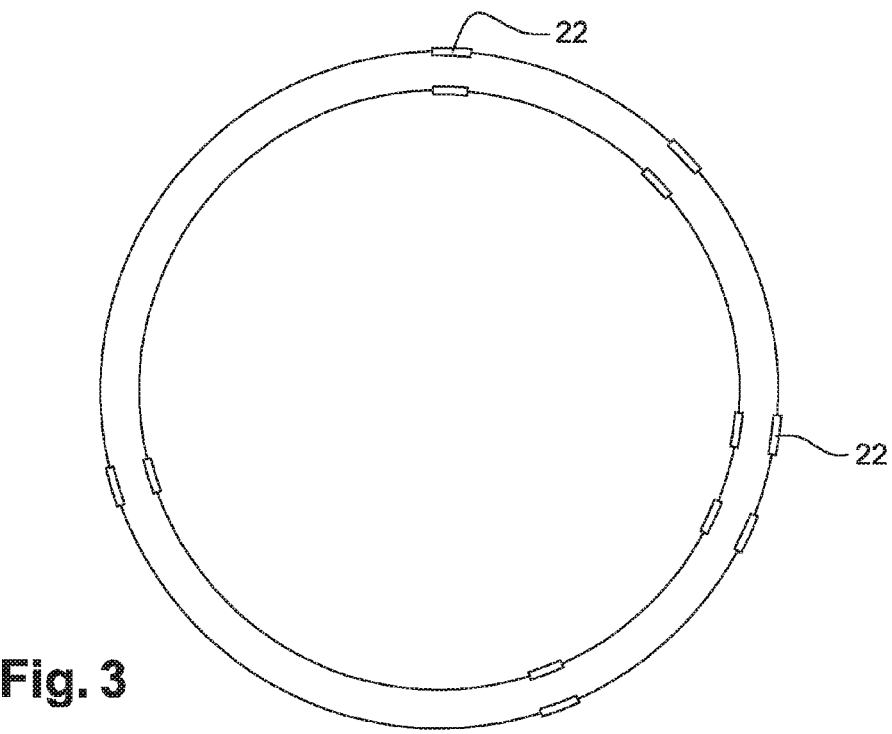
FIG. 3 shows a schematic side view of the adapter constituting the mounted assembly according to an embodiment of the invention.

FIG. 3 shows that the adapter comprises various conductive strips 22, positioned irregularly about its circumferential perimeter. The representation shows an irregular spacing of each conductive strip 22.

The following examples show the results obtained with the assembly according to the invention.

Example: Kerb Knock Tests

This test consists in causing a mounted assembly to mount a kerb at an angle of attack of 30°. The choice of this angle is based on the fact that it constitutes a very harmful stress for a tyre. The test is carried out with two different kerb heights (90 mm and 110 mm).

The test proceeds as follows. Several passes of the wheel at different speeds are carried out until the tyre is punctured. The starting speed is 20 km/h and then the speed is incremented by 5 km/h on each new pass.

A conventional assembly without an adapter (control 1) is compared with an assembly provided with an adapter according to the document WO00/78565 (control 2) and with an assembly provided with an adapter according to the invention (invention). These assemblies are all of the size 205/55R16 comprising a 6.5J16 rim. The results are collated in the following Table I and are given in percent:

TABLE I

|  | Control 1 | Control 2 | Invention |
|---|---|---|---|
| Percentage of the puncturing speed compared with control-kerb height 90 mm | 100 | >150 | >150 |
| Level of vertical thrust force (Fz) recorded at the puncturing speed | 100 | 50 | 40 |
| State of the mounted assembly following the knocks | Tyre punctured Wheel marked | Tyre and wheel intact Adapter plastically deformed | Tyre, adapter and wheel intact |

Results greater than 100 show an improvement in behaviour when subjected to a lateral knock.

The test carried out at the kerb height of 90 mm led to the puncturing of the control tyre at a speed of 30 km/h, whereas the assembly according to the invention did not suffer any damage at the same speed, or even at a speed of 50 km/h. The test carried out at the kerb height of 110 mm led to the puncturing of the control tyre at a speed of 20 km/h, whereas the assembly according to the invention did not suffer any damage at the same speed, or even at a speed of 50 km/h.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. Rolling mounted assembly having a rotation axis and comprising:
   a tire having two beads and an inner wall;
   at least one adapter;
   a rim;
   said adapter providing the connection between one of the beads and the rim, and having a circumferential perimeter;
   said rim having two rim seats and two rim flanges;
   said adapter having:
   an axially inner end that is configured to be mounted on the rim seat and comprises an inner reinforcing element;
   an axially outer end that comprises an outer reinforcing element;
   a body that connects said outer end to said inner end so as to form a single piece and comprises at least one main reinforcement that provides the connection between said outer reinforcer and said inner reinforcer, and an elastomer composition;
   a substantially cylindrical adapter seat configured to receive one of said beads, said seat being situated at the axially outer end of said body; and
   an adapter bearing face substantially contained in a plane perpendicular to the rotation axis, said bearing face being situated on the axially inner face of the axially outer end,
   wherein the reinforcing element of the axially outer end is entirely situated axially outside the bearing face, wherein the body comprises, opposite the adapter seat, an annular seat reinforce, and wherein the adapter comprises at least one, fixed or removable, conductive strip positioned over all or part of the circumferential perimeter of said adapter and along a complete path extending from the adapter seat to the rim J.

2. The assembly according to claim 1, wherein when the conductive strip is removable or fixed, it is positioned entirely at the radially outer surface of the body.

3. The assembly according to claim 1, wherein when the conductive strip is fixed, it is partially buried under the radially outer surface of the body.

4. The assembly according to claim 1, wherein the conductive strip has an electrical resistivity less than or equal to $10^8$ ohm·cm.

5. The assembly according to claim 4, wherein the conductive strip is comprised of a metallic leaf or of an elastomer composition comprising carbon black in an amount greater than or equal to 15%.

6. The assembly according to claim 5, wherein the carbon black of the elastomer composition has a specific surface area greater than or equal to 500 $m^2$/g.

7. The assembly according to claim 5, wherein when the conductive strip is fixed, it is adhesively bonded or cross-linked to the elastomer composition of the body.

8. The assembly according to claim 1, wherein the reinforcing element of the axially outer end is positioned radially on the outside of the adapter seat.

9. The assembly according to claim 1, wherein the annular seat reinforcer has a compression modulus greater than or equal to 1 GPa.

10. The assembly according to claim 1, wherein the annular seat reinforcer is comprised of a core surrounded by an elastomer.

11. The assembly according to claim 10, wherein the core comprises at least one element chosen from a metal, a composite material, a thermoplastic, and a mixture thereof.

12. The assembly according to claim 1, wherein the annular seat reinforcer is comprised of at least two layers of different constituents positioned in alternation.

13. The assembly according to claim 11, wherein the composite material is comprised of glass fibres embedded in a resin material.

14. The assembly according to claim 1, wherein the annular seat reinforcer has an overall axial length greater than or equal to 30% of the width of the bead of the tire, and less than 150% of this same width.

15. The assembly according to claim 1, wherein the annular seat reinforcer has an axial length between 40 and 110% of the width of the bead of the tire.

16. The assembly according to claim 1, wherein the annular seat reinforcer has a mean radial thickness greater than or equal to 0.3 mm and less than or equal to 20 mm.

17. The assembly according to claim 1, wherein the rim is comprised of a material selected from steel, alloys of aluminium and/or of magnesium, composite materials based on carbon fibres, glass fibres, aramid fibres, plant fibres, said fibres being comprised in a matrix based on thermosetting compounds or on thermoplastic compounds, or from a complex compound comprising an elastomer and a complex based on resin and fibres selected from carbon fibres, glass fibres, aramid fibres, plant fibres or from any combination of materials.

18. The assembly according to claim 17, wherein the fibre-based composite materials comprise fibres having a length greater than or equal to 5 mm.

19. The assembly according to claim 17, wherein the matrix based on thermosetting compounds may be selected from epoxy resins, vinyl ester, unsaturated polyesters, cyanate ester, bismaleimide, acrylic resins, phenolic resins, polyurethanes and combinations thereof.

20. The assembly according to claim 17, wherein the matrix based on thermoplastic compounds is selected from polypropylene (PP), polyethylene (PE), polyamides (PAs), semiaromatic polyamides, polyester (PET), polybutylene terephthalate (PBT), polyetheretherketone (PEEK), polyetherketoneketone (PEKK), polyethersulphone (PSU), polyetherimide (PEI), polyimide (PI), polyamideimide (PAI), polyphenylene sulphide (PPS), polyoxymethylene (POM), polyphenylene oxide (PPO).

21. An adapter configured to equip a rolling mounted assembly having a rotation axis, wherein the assembly includes a tire having two beads and an inner wall, a rim having two rim seats and two rim flanges;
  wherein the adapter provides a connection between one of the beads and the rim, and having a circumferential perimeter, the adapter comprising:
    an axially inner end that is configured to be mounted on the rim seat and comprises an inner reinforcing element;
    an axially outer end that comprises an outer reinforcing element;
    a body that connects said outer end to said inner end so as to form a single piece and comprises at least one main reinforcement that provides the connection between said outer reinforcer and said inner reinforcer, and an elastomer composition;
    a substantially cylindrical adapter seat configured to receive one of the beads, said seat being situated at the axially outer end of said body; and
    an adapter bearing face substantially contained in a plane perpendicular to the rotation axis, said bearing face being situated on the axially inner face of the axially outer end,
  wherein the reinforcing element of the axially outer end is entirely situated axially outside the bearing face, wherein the body comprises, opposite the adapter seat, an annular seat reinforce, and wherein the adapter comprises at least one, fixed or removable, conductive strip positioned over all or part of the circumferential perimeter of the adapter and along a complete path extending from the adapter seat to the rim J.

* * * * *